United States Patent [19]

Rampy et al.

[11] 4,332,769

[45] Jun. 1, 1982

[54] DISPOSABLE TITRATION DEVICE

[75] Inventors: Gordon A. Rampy, Warrenton; Henry B. Castaneda, Woodbridge, both of Va.

[73] Assignee: Chemetrics, Inc., Warrenton, Va.

[21] Appl. No.: 185,978

[22] Filed: Sep. 10, 1980

[51] Int. Cl.$^{3}$ .............................................. G01N 31/16

[52] U.S. Cl. ...................................... 422/75; 422/102; 422/103

[58] Field of Search .......................... 422/75, 102, 103; 137/151

[56] References Cited

U.S. PATENT DOCUMENTS

| | | | |
|---|---|---|---|
| 1,594,370 | 8/1926 | Kubota | 422/102 |
| 2,341,129 | 2/1944 | Thompson | 137/151 |
| 3,634,038 | 1/1972 | Rampy | 422/56 |
| 3,635,092 | 1/1972 | Maughan et al. | 422/103 |

FOREIGN PATENT DOCUMENTS

| | | | |
|---|---|---|---|
| 949996 | 2/1964 | United Kingdom | 422/75 |

OTHER PUBLICATIONS

Modern Laboratory Appliances, Fshe-Scientific Co., 1935, p. 167.

*Primary Examiner*—William F. Smith
*Attorney, Agent, or Firm*—Milton Zucker

[57] ABSTRACT

A device for quantitative analysis of fluids which consists of a rigid, transparent tube containing a predetermined quantity of reagent and end-point indicator, evacuated and fitted with a valve which is suitable for sealing and for precisely controlling the entry of sample fluid so that upon immersion of the valve in the sample fluid and opening and closing it as desired, a quantity of sample fluid may be introduced to the tube and mixed with the reagent contained therein which is precisely the amount necessary to cause a visible change indicating complete neutralization of the reagent. The amount of material being analyzed for can then be ascertained by measuring the amount of sample fluid introduced and applying a simple mathematical formula.

4 Claims, 1 Drawing Figure

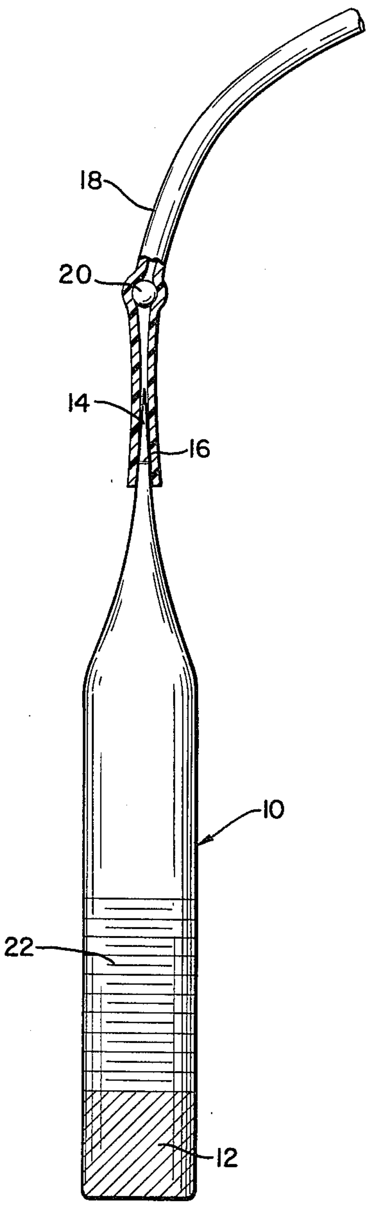
18
20
14
16
10
22
12

DISPOSABLE TITRATION DEVICE

FIELD OF THE INVENTION

This invention relates to the quantitative chemical analysis of liquids, and aims to provide a device and method for the ready determination of some chemical constituent of a liquid in the field rapidly and inexpensively by operators without extensive analytical experience.

DESCRIPTION OF THE PRIOR ART

The analysis of fluids for a specific chemical constituent is often accomplished by a procedure known as titration, in which a standard solution is mixed in increments with a sample to which has been added a color-forming indicator so that a marked color change occurs at the point where the amount of standard solution just neutralizes all of the constituent present in the sample. At this end-point, the amount of the unknown constituent in the sample may be ascertained from the amount of standard solution used.

In the laboratory, titrations are ordinarily carried out by the use of cylindrical dispensers having scale markings for measuring the amount of standard solution dispensed, with valves to permit drop-by drop addition of standard solution to the sample. These devices are rather cumbersome for field use. In the field, more compact and less fragile devices have been used. Some of these—digital titrators, for example—are very expensive; others—drop count titrators—are crude and necessitate such careful handling of standard reagent under field conditions that results tend to be uncertain.

A commercially successful device for conducting liquid analyses in a somewhat different manner is shown in U.S. Pat. No. 3,634,038 issued Jan. 11, 1972 to one of the inventors herein. That device consists of an evacuated cylindrical tube drawn at one end to a frangible sealed tip, containing a measured amount of a standard reagent carrying an indicator which develops a color varying in intensity with the concentration of the ingredient being tested for. The tip is immersed in the liquid to be tested. On breaking the seal, a definite amount of liquid is drawn into the tube, and the two liquids are mixed. The color developed is compared with a standard to determine the sample's content of the ingredient being analyzed for.

Because the device is inexpensive to produce and had proven its utility in the marketplace, its modification to permit titration to an end-point was investigated. It was necessary to control the flow of the sample into the reagent solution containing the indicator drop-by-drop, to get the desired accuracy. It was found that this control was extremely difficult to produce since the device had to extend into the liquid being analyzed at all times after unsealing in order not to lose the driving force of the vacuum, and the tube had to be shaken to mix the liquids between additions.

OBJECTS OF THE INVENTION

This invention aims to provide a simple, inexpensive, disposable device characterized by low cost, high reliability, extreme simplicity of design and ease of operation, so that it can be used by a person without technical training in the field to measure, for example, the hardness of a domestic water supply, the concentration of chlorine in drinking water, the amount of sulfite oxygen scavenger in a boiler water sample, or any of a host of similar analyses.

SUMMARY OF THE INVENTION

In accordance with the present invention, we attain these objects by providing an evacuated glass or other transparent tube with walls strong enough so that it can be handled without danger of breaking, and of such cross section—preferably cylindrical—that the volume of contents can be readily measured, and containing a predetermined quantity of a reagent designed to test the sample being analyzed, and provided with a readily frangible tip at one end thereof and a connector over the tip so that on connection of the tip with the fluid to be tested and breaking of the frangible tip, the vacuum in the tube will draw sample through the connector and tip into the tube. In order to prevent unwanted flow of sample into the tube, a valve is provided in the connector between the tip and the sample. This valve must be self-closing, i.e., it must require manipulation to open it and to keep it open; if the valve is not self-closing, it is very difficult to control the flow of liquid, keep the end of the connector in the sample, and mix the sample and reagent in the tube. Most desirably, the connector is a length of flexible tubing of desired length and internal diameter, into which there has been inserted a bead of glass or other rigid material of a size large enough to completely close the tubing, except when the tube is pinched, as by finger action adjacent the bead to produce a narrow opening; on removal of the pinching pressure, the tube seals instantly.

The method of using the device is opposite to normal titration methods. The tube contains a measured amount of reagent preferably containing the indicator. The sample containing indicator, if there is none in the reagent, is introduced as desired by opening the valve. Since it shuts off automatically, the operator is free to both shake the tube between additions with one hand and keep the connector in the sample with the other, without the possibility of unwanted sample being added. In this fashion, a drop-by-drop addition to an accurate endpoint can be attained; the amount of sample added can be determined from a scale indicated on the tube, or on a scale held against the tube, and the concentration of the ingredient being analyzed for in the sample can be calculated from the known amount and strength of reagent, and the amount of sample added.

BRIEF DESCRIPTION OF THE DRAWING

The drawing is a cross-section through the device.

DESCRIPTION OF THE INVENTION

As shown in the drawing we use a tube 10 which is preferably of glass, but may be of any transparent or translucent material which does not interfere with the desired analysis and which can be sealed at the frangible tip and then readily broken there. It is important that the walls of the tube be of sufficient strength to permit handling; ordinary test tube glass is adequate. The tube is filled with a reagent solution containing an end-point indicator for the desired analysis, the end is drawn out in a slender thin-walled, readily frangible tip 14, the tube is evacuated of essentially all air and the tip 14 is sealed and then scored, as by scratching with a file, to produce a score mark 16 which acts to insure breaking of the tip at that point when pressure is later applied. A length of flexible rubber, or preferably clear plastic tubing 18 such as the plasticized vinyl tubing commonly used in laboratories, is fitted tightly over the tapered tip of the tube 10 to a point well below the score mark 16. Inserted into the flexible tube 18 close to but not in contact with the frangible sealed tip 14 is a bead 20 of glass or other rigid material of sufficient diameter to form a tight seal with the walls of the flexible tube 18. For convenience the tube 10 has a flat bottom.

In use, pressure is applied to the frangible tip 14 so that it breaks at the score mark 16. The open end of the flexible tube 18 is then immersed in the sample fluid to be analyzed, and squeezing pressure is applied briefly to the flexible tube surrounding the bead 20 so as to open a minute passageway around the bead and allow a small amount of sample fluid to flow into the glass tube 10, and is mixed with the reagent therein by shaking. The analyst observes the color of the resulting solution and repeats the process until an increment of sample fluid causes the anticipated change in color signaling that the equivalence point has been reached. By means of a scale 22 on the tube, or by using a separate scale, the analyst measures the height of the liquid level above that of the original reagent in order to ascertain the amount of sample added, from which the composition of the sample can be calculated. Obviously, the device which is the subject of this invention does not have to be sealed by closure of the drawn tip if the flexible tube valve unit makes an effective vacuum seal, but we prefer to use the sealed tip in order to insure a high degree of reliability and to avoid contact between the reagent and the flexible plastic tube which could lead to degradation of the material and the reagent.

Obviously, the flexible squeeze valve described might be replaced by some other self-closing valves, but it is preferred because of its low cost, simplicity, reliability and ease of operation.

The process employed by the device which is the subject of this invention is opposite to that of an ordinary titration in that sample fluid is added to a measured quantity of reagent until the point of equivalence is reached. This reversed titration process benefits the analyst by eliminating the hazards associated with the handling of chemical reagents, by making necessary the measurement of only one of the two reactants at the time the analysis is performed and by allowing the reagent to be packaged in such a way as to insure purity and retention of full strength.

A convenient size glass tube will be 10 to 15 millimeters in diameter; 0.5 to 1-millimeter walls are sufficient to give adequate strength. The taper is drawn to about 2 millimeters in outside diameter and the score mark 16 will be conveniently 3 to 5 millimeters from the actual tip.

In general, we prefer to evacuate to a pressure of the order of 20 millimeters absolute, which is generally sufficient to remove virtually all permanent gases from the tube and insure that only water vapor remains on sealing. Such a tube will have the capacity to fill completely with the sample fluid should it be necessary to do so in carrying out the analysis.

Obviously, in order to prepare a practical device suitable for the analysis of a particular sample for a particular constituent, consideration must be given by one skilled in the art to the selection of a proper filling level and to the formulation of a reagent having appropriate concentrations of active ingredient and other components such as indicators, stabilizers, buffers, solvents, etc.

Our analytical device offers several advantages over devices and methods now available to the analyst for testing fluid samples. Since the device is constructed of ordinary, inexpensive, commercially available components, it can be manufactured and sold to the user at the low cost required for a disposable item which is used only once. Also, the device has the advantage of safety because it packages the chemical reagent in very small quantities which are not removed from their containers and therefore avoids the hazards of handling corrosive or poisonous chemicals during analysis. Because it is sealed under vacuum, the device insures the usefulness, even after prolonged storage, of reagents which would otherwise suffer from exposure to oxygen or from evaporation in ordinary containers. A very great advantage offered by the device is simplicity and ease of operation whereby a person untrained in analytical chemistry can readily perform the simple operations necessary to get the result. The device is therefore particularly useful in several contexts. One of these is in and about the home for analyses such as measuring the hardness of household water. Another is in routine testing of boiler water where operators untrained in chemistry can make limited determinations easily. And yet another is in water pollution testing in the field, where elaborate test facilities are not available.

SPECIFIC EXAMPLES OF THE INVENTION

Typical illustrations of the analyses that can be readily performed are described in the following examples.

EXAMPLE 1

Hardness of Water: Range 5 to 975 mg/L as $CaCO_3$.

Reagent: In 900 ml. distilled water dissolve 60 gm. tris(hydroxymethyl) aminomethane, 0.30 gm. ethylene diamine tetracetic acid (EDTA), 0.02 gm. calmagite indicator, 0.2 gm. magnesium, di-sodium salt of EDTA, 0.25 gm. magnesium sulfate and sufficient ammonium hydroxide to adjust pH to 11.0. Dilute with distilled water to 1000 ml.

A glass tube of 12 mm. inside diameter tapered at one end and having a straight section height of 78 mm. is charged with reagent to a height of 13 mm. (approximately 1 ml.), evacuated to an absolute pressure of 20 mm. Hg, sealed and scratched with a file at a point 5 mm. from the tip. A 100 mm. length of soft polyvinyl chloride tubing having an outside diameter of 3/16 inch and an inside diameter of ⅛ inch is forced over the tapered end of the glass tube to a point 20 mm. beyond the tip, and a glass bead 3 mm. in diameter is inserted into the flexible tube to a point 2–3 mm. from the tip.

To perform an analysis, the analyst applies pressure to break the sealed tip at the score mark and places the open end of the flexible tube in the water sample to be tested. He then squeezes the tube at the point where the bead is inserted until a small amount of liquid is observed to enter the glass tube and then releases the pressure to stop the flow. If after gentle mixing, the liquid in the tube remains purple, he repeats the process of immersing the tube end, squeezing the valve briefly and observing the color until a change to red is effected. Holding the tube in a vertical position, the analyst then uses a millimeter scale to measure the height of the liquid and subtracts from the measurement the 13 mm. height of the reagent to obtain the height (H) of added sample.

Since the reagent concentration is equivalent to 75 mg/L hardness as $CaCO_3$, the hardness of the sample may be calculated as follows:

$$\text{Hardness} = (13 \times 75)/(H)$$

Therefore, a sample which required filling to a height (H) of 65 mm. would have a hardness of $(13 \times 75)/(65)$, or 15 mg/L as $CaCO_3$ and a sample which required filling to a height of only 1 mm. would have a hardness of $(13 \times 75)/(1)$, or 975 mg/L as $CaCO_3$. Samples of intermediate hardness would obviously require filling heights between 1 and 65 mm.

EXAMPLE 2

Sulfite in Boiler Water. Range 2 to 133 mg/L $SO_3$

Reagent: In 800 ml. distilled water dissolve 1 gm. di-sodium salt of EDTA, 50 ml. sulfuric acid, 100 ml. diethylene glycol, 10 gm. sulfamic acid, 5 gm. starch indicator, 0.01 gm. potassium iodate, 2 gm. potassium iodide, and 0.3 gm. sodium bicarbonate. Dilute to 1000 ml. with distilled water.

A device is prepared and employed exactly as described in Example 1 above except that the analyst observes a change from blue to colorless at the end-point of the analysis.

Since the reagent concentration in this example is equivalent to 10 mg/L $SO_3$, the sulfite content of the sample may be calculated as follows:

$$\text{Sulfite} = (13 \times 10)/(H)$$

Therefore, a sample which required filling to a height (H) of 65 mm. would have a sulfite content of $(13 \times 10)/(65)$ or 2 mg/L $SO_3$ and a sample which required filling to a height (H) of only 1 mm. would have a sulfite content of $(13 \times 10)/(1)$ or 130 mg/L $SO_3$. Samples of intermediate sulfite content would obviously require filling heights between 1 and 65 mm.

In the above examples, no attempt has been made to describe in detail the limits of accuracy or effects of interfering species. That information is readily available in standard treatises dealing with chemical analysis and has no direct bearing on the application of this invention.

Obviously, the examples can be multiplied indefinitely without departing from the scope of the claims.

What is claimed is:

1. A disposable device for onetime quantitative chemical analysis of a fluid comprising a transparent tube of such cross-section that the volume of its contents can be readily measured and of sufficient wall strength to permit ready handling, and having one end thereof drawn to a sealed frangible tip, said tube being evacuated and containing a predetermined quantity of a liquid reagent for the desired analysis, a connector tightly fitting over the frangible tip of sufficient length for ready immersion into the fluid being analyzed, the connector being of material readily deformable by finger pressure of the analyst to permit ready breaking of said frangible tip, said connector having within it a rigid bead of a size suitable for effecting a leak-tight seal in the connector except when a passage is induced by deformation of the deformable connector, thereby producing a positive self-closing valve in the connector.

2. The device of claim 1, in which the reagent contains an end-point indicator.

3. The device of claim 1, in which the reagent is an alkaline solution of ethylene diamine tetraacetic acid for determining hardness of water.

4. The device of claim 1, in which the reagent is an acetic solution of iodine with a starch indicator for determining sulfite.

* * * * *